(12) United States Patent
Song

(10) Patent No.: US 11,951,407 B2
(45) Date of Patent: Apr. 9, 2024

(54) SCREEN SOCCER SYSTEM AND METHOD OF PROVIDING SCREEN SOCCER

(71) Applicant: Jin Woo Song, Suwon-si (KR)

(72) Inventor: Jin Woo Song, Suwon-si (KR)

( * ) Notice: Subject to any disclaimer, the term of this patent is extended or adjusted under 35 U.S.C. 154(b) by 386 days.

(21) Appl. No.: 17/312,494

(22) PCT Filed: Dec. 10, 2019

(86) PCT No.: PCT/KR2019/017372
§ 371 (c)(1),
(2) Date: Jun. 10, 2021

(87) PCT Pub. No.: WO2020/122550
PCT Pub. Date: Jun. 18, 2020

(65) Prior Publication Data
US 2022/0096917 A1 Mar. 31, 2022

(30) Foreign Application Priority Data
Dec. 11, 2018 (KR) ........................ 10-2018-0159206

(51) Int. Cl.
*A63F 7/06* (2006.01)
*A63B 69/00* (2006.01)
(Continued)

(52) U.S. Cl.
CPC .......... *A63F 7/0616* (2013.01); *A63B 69/002* (2013.01); *A63B 71/0622* (2013.01); *H04N 7/183* (2013.01)

(58) Field of Classification Search
CPC .... A63F 7/0616; A63F 13/352; A63F 13/212; A63F 13/213; A63F 13/218;
(Continued)

(56) References Cited

U.S. PATENT DOCUMENTS

| 2011/0230273 A1* | 9/2011 | Niegowski | ............... A43B 3/34 473/223 |
| 2013/0130843 A1* | 5/2013 | Burroughs | ............ G01S 13/751 473/415 |

(Continued)

FOREIGN PATENT DOCUMENTS

| JP | 2001-187269 A | 7/2001 |
| KR | 10-2016-0090148 A | 7/2016 |

(Continued)

OTHER PUBLICATIONS

International Searching Authority, International Search Report of PCT/KR2019/017372 dated Apr. 10, 2020 [PCT/ISA/210].

*Primary Examiner* — Peter J Iannuzzi
(74) *Attorney, Agent, or Firm* — Sughrue Mion, PLLC

(57) ABSTRACT

A screen soccer system and method are disclosed. The screen soccer system includes a system server including a data transceiver, a running information processor, an image output part, and a kicking information processor. The running information processor receives footstep information of user in real time from a first footstep sensing device. The image output part transmits the running image information to an image output device through the data transceiver. The data transceiver receives gravity center movement information of the user transmitted from a second footstep sensing device. The kicking information processor analyzes and converts the gravity center movement information, the kicking motion information, and the soccer ball kicking information into kicked ball image information regarding a kicked ball path. The image output part transmits the kicked ball image information to the image output device through the data transceiver.

6 Claims, 4 Drawing Sheets

(51) Int. Cl.
*A63B 71/06* (2006.01)
*H04N 7/18* (2006.01)

(58) Field of Classification Search
CPC .... A63F 13/235; A63F 13/327; A63F 13/428; A63F 13/812; A63F 13/211; A63F 2009/2457; A63B 69/002; A63B 71/0622; A63B 24/0087; A63B 2071/0694; A63B 2220/10; A63B 2220/20; A63B 2220/52; A63B 2220/56; A63B 2220/805; A63B 2220/833; A63B 2225/50; A63B 2243/0025; H04N 7/183; G06Q 50/10
See application file for complete search history.

(56) References Cited

U.S. PATENT DOCUMENTS

2014/0080638 A1    3/2014  Feng et al.
2015/0328516 A1*  11/2015  Coza ................. A63B 71/0619
                                                                    700/91
2016/0310820 A1*  10/2016  Kline ................. A63B 69/0026

FOREIGN PATENT DOCUMENTS

KR          102037966 B1    10/2019
WO         2013/083102 A1    6/2013

* cited by examiner

SCREEN SOCCER SYSTEM AND METHOD OF PROVIDING SCREEN SOCCER

CROSS REFERENCE TO RELATED APPLICATIONS

This application is a National Stage of International Application No. PCT/KR2019/017372, filed Dec. 10, 2019, claiming priority to Korean Patent Application No. 10-2018-0159206, filed Dec. 11, 2018.

BACKGROUND

1. Field of the Invention

The present invention relates to a screen sports system, and more particularly, to a screen soccer system.

2. Discussion of Related Art

Recently, amusement facilities which provide a realistic simulation environment, such as screen golf, are popular. Existing screen sports simulation systems calculate a physical quantity according to kicking of a ball and show an image of a trajectory of the ball to a user, thereby increasing interest in the game and providing a sense of realism as if enjoying the game outdoors.

In the case of screen golf, interesting elements of golf enjoyed on the actual course are well incorporated, and walking or running does not take up a large portion compared to the case of baseball and soccer. Screen soccer has a similar aspect to screen golf in that a user kicks a soccer ball. However, in soccer, running takes up a large portion of the game. Accordingly, unless a motion corresponding to running is included, it is difficult to simulate an actual soccer game well.

Meanwhile, in public education institutions such as elementary schools, middle schools, high schools, etc., students are divided into a plurality of classes, and lessons are provided according to an academic schedule set for each class. Therefore, even in bad weather, physical education classes should be held according to the schedule. Sports activities using indoor auditoriums and the like are possible, but there is a problem of using a relatively cramped space compared to the playground.

In the public education field in which the curriculum is set according to a certain schedule, screen sports are considered to be more useful when indoor spaces are used for physical education in bad weather. In particular, if information related to walking or running is input in addition to the schedule, it will help to increase not only interest but also actual physical strength and will enable users to enjoy a more realistic soccer game.

SUMMARY OF THE INVENTION

A screen soccer system according to the present invention is directed to providing not only a kicking play experience of kicking a soccer ball but also an experience like actual running.

Objects of the present invention are not limited to those described above, and other objects which have not described will be clearly understood by those of ordinary skill in the art from the following descriptions.

According to an aspect of the present invention, there is provided a screen soccer system including a system server which includes a data transceiver, a running information processor, an image output part, and a kicking information processor. The running information processor of the system server receives footstep information of a user in real time from a first footstep sensing device, which measures footstep information, through the data transceiver and converts the footstep information into running image information of the user. The image output part transmits the running image information to an image output device through the data transceiver. The data transceiver receives gravity center movement information of the user transmitted from a second footstep sensing device, which measures movement of a gravity center, and kicking motion information and soccer ball kicking information of the user transmitted from an image sensing device. The kicking information processor of the system server analyzes and converts the gravity center movement information, the kicking motion information, and the soccer ball kicking information into kicked ball image information regarding a path of the kicked ball. The image output part of the system server transmits the kicked ball image information to the image output device through the data transceiver.

The first footstep sensing device or the second footstep sensing device may include a data communicator configured to transmit or receive data to or from the system server, a sensing part including a vibration sensor, a pressure sensor, or an optical sensor, and a measurement controller measurement controller configured to measure the footstep information of the user through the sensing part and transmit the footstep information to the system server through the data communicator and configured to control the sensing part to stop measuring when footstep end information calculated by the system server using the received footstep information is received through the data communicator, or configured to measure the gravity center movement information of the user through the sensing part, transmit the gravity center movement information to the system server, and control the sensing part to stop measuring when kicking end information calculated by the system server using the received gravity center movement information and image information received from the image sensing device is received through the data communicator.

Each of the first and second footstep sensing device may further include a distance measuring part configured to measure a distance by recognizing each other's position, and when a mutual position measurement signal is generated by setting information transmitted from the system server or operation of a setting switch provided on one side of the first footstep sensing device or the second footstep sensing device, the measurement controller of the first footstep sensing device or the second footstep sensing device may generate position information thereof and transmit the position information to the system server through the data communicator of the first footstep sensing device or the second footstep sensing device.

According to another aspect of the present invention, there is provided a method of providing screen soccer, the method including receiving, by a running information processor of a system server, footstep information of a user in real time from a first footstep sensing device which measures the footstep information through a data transceiver of the system server and converting the footstep information into running image information of the user, transmitting, by an image output part of the system server, the running image information to an image output device through the data transceiver, receiving, by the data transceiver, gravity center movement information of the user transmitted from a second footstep sensing device which measures movement of a gravity center and kicking motion information and soccer ball kicking information of the user transmitted from an image sensing device, analyzing and converting, by a kicking information processor of the system server, the gravity center movement information, the kicking motion information, and the soccer ball kicking information into kicked ball image information regarding a path of the kicked ball, and transmitting, by the image output part, the kicked ball image information to the image output device through the data transceiver.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
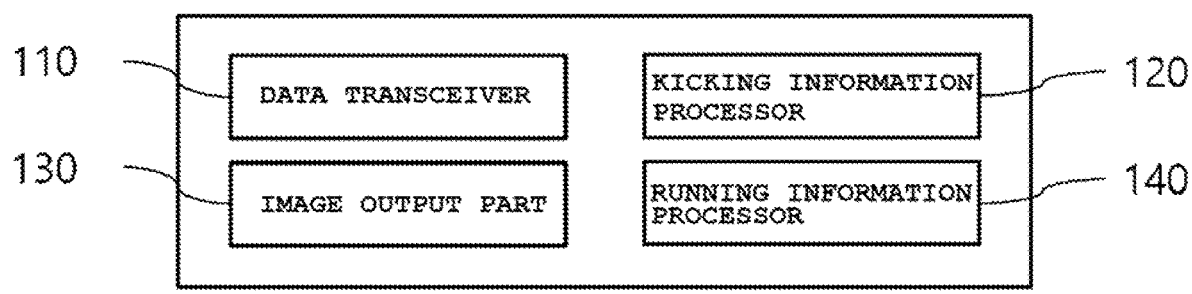
FIG. 1 is a block diagram of a system server of the present invention.

Objects and effects of the present invention and technical configurations for achieving them will become apparent with reference to embodiments described in detail below in conjunction with the accompanying drawings. In the following description of the present invention, known functions or configurations will not be described in detail when it is determined that the gist of the present invention may be unnecessarily obscured thereby. The following terms are defined in consideration of the functions in the present invention and may vary depending on the intentions or customs of a user or operator.

However, the present invention is not limited to the embodiments disclosed below but may be implemented in various other ways. The embodiments are provided so that the disclosure of the present invention will be thorough and complete and will fully convey the scope of the invention to those of ordinary skill in the art. The scope of the present invention is only defined by the claims. Therefore, definitions should be based on the overall content of this specification.

Throughout the specification, when a part is referred to as "including" or "having" a certain component, this does not preclude other components and means that other components may further be included unless stated to the contrary. Also, terms, such as "unit," "part," or "module," refer to units for processing at least one function or operation, and such units may be implemented with hardware, software, or a combination of hardware and software.

Meanwhile, in exemplary embodiments of the present invention, each of components, functional blocks, or units may include one or more sub-components, and electrical, electronic, and mechanical functions performed by the components may be implemented as various known devices or mechanical components including an electronic circuit, an integrated circuit, an application specific integrated circuit (ASIC) and the like. The components may be separately implemented, or two or more of the components may be integrated into one component.

Combinations of the individual blocks of the appended block diagram and flowchart may also be performed by computer program instructions. These computer program instructions may be loaded into a processor of a general-purpose computer, a special-purpose computer, a mobile device, such as a portable laptop computer, a network computer, or a smart phone, an online game service providing server, or other programmable data processing equipment so that the instructions performed through the processor of a computer device or other programmable data processing equipment generate units for performing functions described in each block of the block diagram or each operation of the flowchart to be described below.

These computer program instructions may also be stored in a computer-usable or computer-readable memory capable of directing a computer or other programmable data processing equipment to implement the functionality in a particular manner. Accordingly, the instructions stored in the computer-usable or computer-readable memory may produce a product containing instructions for performing functions described in each block of the block diagram or each operation of the flowchart. The computer program instructions may also be stored in a computer device or other programmable data processing equipment. Accordingly, the computer program instructions may generate a process for performing a series of operations on the computer device or the programmable data processing equipment and provide operations for performing functions described in each block of the block diagram or each operation of the flowchart.

In addition, each block or each operation may represent a part of a module, segment, or code that includes one or more executable instructions for executing a specified logical function. It is to be noted that in some alternative embodiments, functions described in blocks or operations may occur out of order. For example, two blocks or operations shown consecutively may be performed substantially concurrently in practice, or the blocks or operations may sometimes be performed in reverse order according to the corresponding function.

In exemplary embodiments of the present invention, a system server and a user device mean any calculation unit for collecting, reading, handling, processing, storing, and displaying data such as a desktop computer, a laptop computer, a smart phone, a personal digital assistant (PDA), a cellular phone, and a game machine. In particular, the user device in exemplary embodiments of the present invention may be a device having a function of executing software written in interpretable code and displaying the software being executed. Also, as necessary, the user device may store the software therein or read the software together with data from the outside.

Also, the system server or the user device in exemplary embodiments of the present invention may include not only the above data processing function but also functions of input, output, storage, and the like. To this end, the system server or the user device may include not only various elements, such as a central processing unit (CPU), a mainboard, a graphics card, a hard disk drive, a sound card, a speaker, a keyboard, a mouse, a monitor, a universal serial bus (USB) terminal, and a communication modem, that general computing devices have but also a CPU, a mainboard, a graphics chip, a memory chip, a sound engine, a speaker, a touchpad, an external connection terminal, such as a USB terminal, a communication antenna, a communication modem for performing third generation (3G), Long Term Evolution (LTE), LTE-advanced (LTE-A), Wi-Fi, fourth generation (4G), fifth generation (5G), Bluetooth, etc. communication, and the like that wireless smart phone terminals have.

Such elements may be used alone or in combination of two or more or parts of the elements may be combined to implement one or more functions. Devices, which are illustrated as one or more blocks in the drawings or detailed description according to exemplary embodiments of the present invention, or parts of the devices may represent one or more functions which are provided by various elements included in the user device alone or in combination of two or more or combined parts of the elements.

Hereinafter, a method of providing screen soccer according to exemplary embodiments of the present invention will be described in detail with reference to the accompanying drawings.

FIG. 1 is a block diagram of a system server 100 of the present invention. Referring to the drawing, the system server 100 includes a data transceiver 110, a running information processor 140, an image output part 130, and a kicking information processor 120.

The data transceiver 110 may include a communication modem for performing 3G, LTE, LTE-A, Wi-Fi, 4G, 5G, Bluetooth, etc. communication. However, the data transceiver 110 is not limited thereto, and any transceiver which may transmit data in a wired manner or transmit and receive data in other ways may be applied without limitation.

Specifically, the data transceiver 110 transmits and receives footstep information of a user transmitted from a first footstep sensing device 200, gravity center movement information of the user transmitted from a second footstep sensing device 300, kicking motion information and soccer ball kicking information of the user transmitted from an image sensing device C, and the like.

The gravity center movement information, kicking information, soccer ball kicking information, etc. received through the data transceiver 110 may be stored in a data storage of the system server 100 or immediately transmitted to the kicking information processor 120 and used for processing relevant information.

The running information processor 140 may analyze information on a case in which the user makes a stepping motion or moves the center of gravity on the first footstep sensing device 200 or the second footstep sensing device 300 and process information on a running direction, a running speed, running start and end time points, and the like.

Specifically, the running information processor 140 may receive the footstep information of the user from the first footstep sensing device 200, which measures footstep information, through the data transceiver 110 and convert the footstep information into running image information of the user.

The first footstep sensing device 200 may include a data communicator which is provided to transmit or receive data to or from the system server 100, a sensing part, and a measurement controller. In particular, the first footstep sensing device 200 may measure footstep information of the user who is in a running motion.

In the first footstep sensing device 200, the measurement controller may measure footstep information of the user through the sensing part and transmit the footstep information to the system server 100 through the data communicator. When the first footstep sensing device 200 receives footstep end information, which is calculated using the footstep information, from the system server 100 through the data communicator, the sensing part may be controlled to stop measuring.

For example, after the user runs a specific distance (e.g., 10 m, 20 m, or 30 m) to run for kicking, footstep end information may be generated. In a free kick situation of soccer, a player runs to gather the power necessary for kicking, and information on the running distance may be stored in the system server 100 in advance and used for generating footstep end information.

The system server 100 may receive information including the user's stride length during walking or running, weight, height, age, sex, etc. in advance and combine the received information with the number of footsteps, the cycle of footsteps, etc. included in the footstep information collected from the first footstep sensing device 200 to calculate comparison information with statistical values according to the distance that the user has run, burned calories, and age. The calculated calorie information and the like may be output through an image output device or transmitted to the user's portable terminal or the like by the user's manipulation.

When the distance that the user has run comes within the range of a distance close to the second footstep sensing device 300 for kicking, the footstep end information may be provided to prevent unnecessary footstep information from being accumulated. For example, assuming a simulation in which the user runs a distance of about 10 m and then takes a free kick, footstep end information may be provided to the user such that the user may be notified that it is the time to stop the approach run (running) and kick the soccer ball. The footstep end information may be projected onto a screen or transferred to the user by an alarm through the speaker or the like. The user may finish running (approach run) through the footstep end information and then make a kicking motion.

When footstep end information is generated after a run with the soccer ball, the system server 100 may generate a start signal for notifying that the user has begun a kicking play, and the signal may be used to activate the second footstep sensing device 300 for collecting footstep information of the user.

The kicking information processor 120 may analyze a flight direction of the kicked ball by analyzing still images or video images collected from the image sensing device C or the like. Also, the kicking information processor 120 may analyze information on the kicked ball by analyzing a kicking motion or a trajectory of the kicked soccer ball and speed of the kicking motion and the kicked soccer ball.

Specifically, the kicking information processor 120 converts the gravity center movement information, the kicking motion information, and the soccer ball kicking information into kicked ball image information regarding a path of the kicked ball by analyzing the gravity center movement information, the kicking motion information, and the soccer ball kicking information. The kicking information processor 120 may analyze data about the kicking motion speed of the user and a traveling direction of the soccer ball included in the kicking motion information and data about a flight trajectory of the kicked soccer ball by synthesizing the pieces of data. Further, the kicking information processor 120 may convert the direction and speed of the kicked soccer ball into the form of video images.

The image output part 130 of the system server 100 transmits the kicked ball image information, running image information of an avatar image embodying the user, etc. to the image output device through the data transceiver 110.

Specifically, the image output part 130 transmits image information of the kicked soccer ball to the image output device so that the flight trajectory of the soccer ball may be output through the image output device which is an output unit such as a screen or a monitor.

The image output part 130 may transmit the running image information, which is obtained by converting the footstep information collected by the first footstep sensing device 200 through the running information processor 140, of the avatar embodying an image of the user to the image output device.

Figure 2:
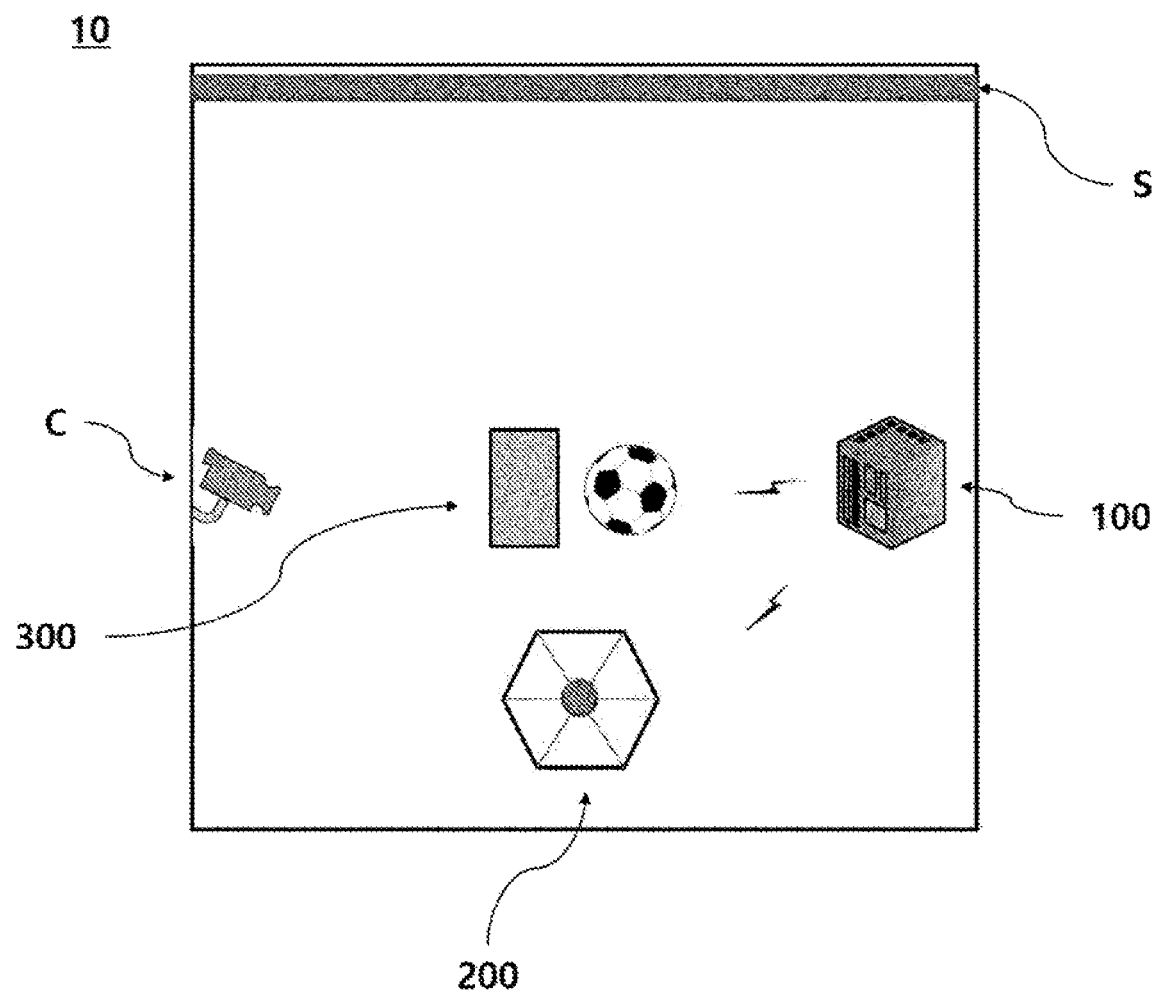
FIG. 2 is a diagram of a screen soccer system according to a first exemplary embodiment of the present invention.
Figure 3:
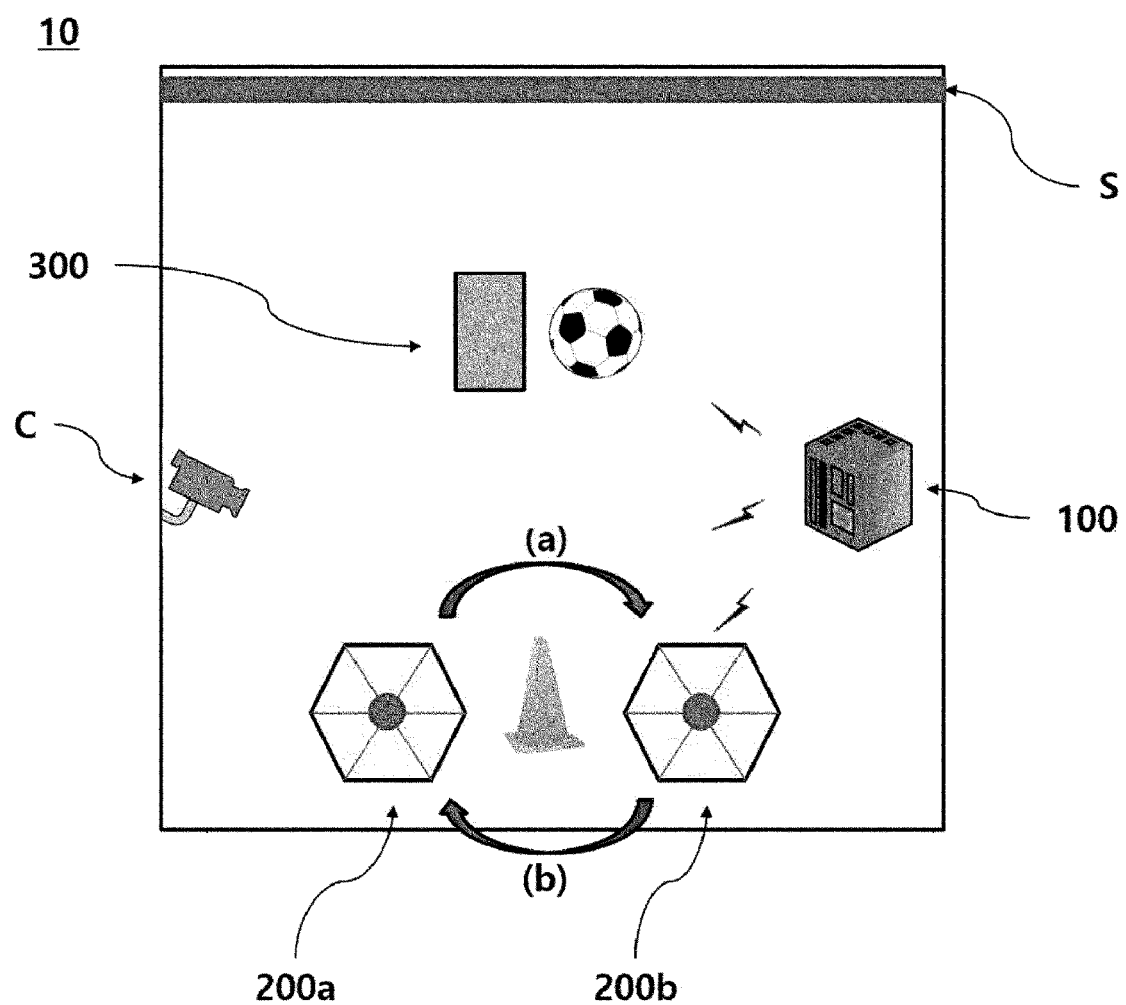
FIG. 3 is a diagram of a screen soccer system according to a second exemplary embodiment of the present invention.

FIG. 2 is a diagram of a screen soccer system 10 according to a first exemplary embodiment of the present invention, and FIG. 3 is a diagram of a screen soccer system 10 according to a second exemplary embodiment of the present invention.

Referring to FIG. 2, in the screen soccer system 10 according to the first exemplary embodiment of the present invention, a first footstep sensing device 200 for measuring a user's number of footsteps and a direction of footsteps and a second footstep sensing device 300 for measuring movement of the user's gravity center are shown.

According to the first exemplary embodiment of the present invention, when the user makes a stepping motion on the first footstep sensing device 200, running is performed, and when footstep end information is generated, the time of arrival to the second footstep sensing device 300 may be measured from a time point at which the footstep end information is generated.

The first footstep sensing device 200 may have a plurality of push plates to adjust a running direction. Each of the push plates may be a unit for inputting that running is performed in a direction in which the push plate is located. Also, the second footstep sensing device 300 may be provided as a rectangular plate to sense gravity center movement and the like of a stepping foot according to a kicking motion of the user.

In the case of laterally dribbling or diagonally running toward the soccer ball, any one push plate may be stepped on for a directional change or the like such that situational running may be allowed.

Here, a distance between the first footstep sensing device 200 and the second footstep sensing device 300 used by the user may be set in advance and used for measuring a distance that the user runs.

However, the present invention is not limited thereto, and each of the first footstep sensing device 200 and the second footstep sensing device 300 may further include a distance measuring part for measuring a distance by recognizing each other's position. When a mutual position measurement signal is generated by setting information transmitted from a system server or operation of a setting switch provided on one side of the first footstep sensing device 200 or the second footstep sensing device 300, a measurement controller of the first footstep sensing device 200 or the second footstep sensing device 300 may generate position information thereof. In this case, the position information may be transmitted to the system server through a data communicator of the first footstep sensing device 200 or the second footstep sensing device 300.

Since the first footstep sensing device 200 and the second footstep sensing device 300 are provided to recognize each other's position, the distance that the user runs may be calculated in consideration of the time that the user moves between the first footstep sensing device 200 and the second footstep sensing device 300.

With the above configuration, even when the first footstep sensing device 200 and the second footstep sensing device 300 are positioned in any place, a distance between the first footstep sensing device 200 and the second footstep sensing device 300 may be measured and used for measuring a distance that the user runs.

For example, the first footstep sensing device 200 and the second footstep sensing device 300 may be spaced about 5 m apart. In this case, when a running information processor generates running information representing that the user has run about 5 m from the first footstep sensing device 200, footstep end information may be provided to the user, and the user may be guided to immediately stop running at the first footstep sensing device 200, run to the second footstep sensing device 300, and kick the soccer ball.

Referring to FIG. 3, in the screen soccer system 10 according to the second exemplary embodiment of the present invention, one pair of first footstep sensing devices 200a and 200b are provided.

Training may be carried out so that a user may perform a reciprocating motion (in direction (a) and direction (b)) while avoiding an obstacle between the first footstep sensing devices 200a and 200b and may step on a second footstep sensing device 300 and then kick a soccer ball when footstep end information is generated.

Figure 4:
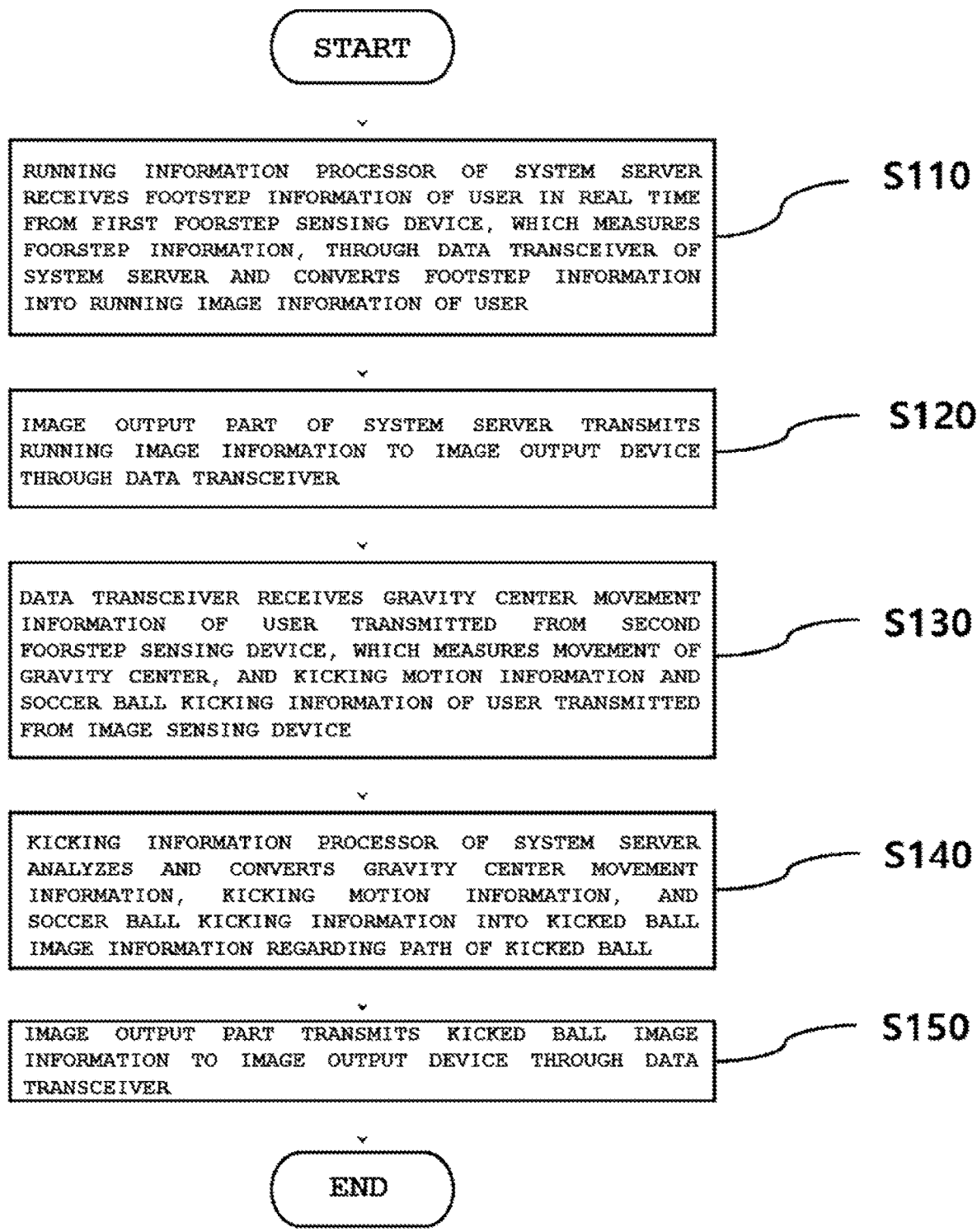
FIG. 4 is a flowchart illustrating a method of providing screen soccer according to another exemplary embodiment of the present invention.

FIG. 4 is a flowchart illustrating a method of providing screen soccer according to another exemplary embodiment of the present invention.

Referring to FIG. 4, first, the method of providing screen soccer according to another exemplary embodiment includes operation S110 in which a running information processor of a system server receives footstep information of a user in real time from a first footstep sensing device, which measures footstep information, through a data transceiver of the system server and converts the footstep information into running image information of the user Here, the running information processor may calculate user-specific information including running distance, burned calories, etc. by synthesizing information including user-specific heights, stride lengths, weights, ages, sexes, and the like. The calculated individual health information and the like may be transmitted to an image output device or terminals such as users' cellular phones.

Subsequently, the method includes operation S120 in which an image output part of the system server transmits the running image information to the image output device through the data transceiver.

When the user runs in place which corresponds to running, running information of the user reflecting the user's stride length information and the like is generated, and the running information may show images of the user's avatar, which is displayed on a screen or the like as running at the same speed, to the user.

Subsequently, the method includes operation S130 in which the data transceiver receives gravity center movement information of the user transmitted from a second footstep sensing device which measures movement of a gravity center and kicking motion information and soccer ball kicking information of the user transmitted from an image sensing device.

Through this operation, the user's kicking motion information and soccer ball kicking information at the moment of kicking are collected such that more precise kicking information may be calculated.

Subsequently, a kicking information processor of the system server analyzes and converts the gravity center movement information, the kicking motion information, and the soccer ball kicking information into kicked ball image information regarding a path of the kicked ball.

Through this operation, the pieces of information are converted into kicked ball image information so that an image showing the soccer ball flying in the same trajectory as an actually kicked soccer ball may be provided.

Subsequently, the method includes operation S150 in which the image output part transmits the kicked ball image information to the image output device through the data transceiver.

Since a ball flying in the same trajectory as an actually kicked ball can be represented on the screen, the user can be aware of the accuracy, speed, etc. of his or her kicking and have training.

The screen soccer system according to the present invention can provide not only a kicking play experience of kicking a soccer ball but also an experience like actual running.

Effects of the present invention are not limited to that described above, and other effects which have not described will be clearly understood by those of ordinary skill in the art from the above descriptions.

In the present specification and drawings, the exemplary embodiments of the present invention have been disclosed. Although specific terms are used, these are merely used in a general sense to easily describe the technical content of the present invention and aid understanding of the present invention and are not intended to limit the scope of the present invention. It is self-evident to those of ordinary skill in the art that modifications can be made based on the technical spirit of the present invention in addition to the embodiments set forth herein.

What is claimed is:

1. A screen soccer system comprising a system server including a data transceiver, a running information processor, an image output part, and a kicking information processor,
    wherein the running information processor of the system server receives footstep information of a user in real time from a first footstep sensing device, which measures footstep information, through the data transceiver and converts the footstep information into running image information of the user,
    the image output part transmits the running image information to an image output device through the data transceiver,
    the data transceiver receives gravity center movement information of the user transmitted from a second footstep sensing device, which is provided separately from the first footstep sensing device, is activated when running has finished on the first footstep sensing device, measures movement of a gravity center when motion is detected on the second footstep sensing device, and receives kicking motion information and soccer ball kicking information of the user transmitted from an image sensing device,
    the kicking information processor of the system server analyzes and converts the gravity center movement information, the kicking motion information, and the soccer ball kicking information into kicked ball image information regarding a path of a kicked ball, and
    the image output part of the system server transmits the kicked ball image information to the image output device through the data transceiver.

2. The screen soccer system of claim 1, wherein the first footstep sensing device or the second footstep sensing device includes:
    a data communicator configured to transmit or receive data to or from the system server;
    a sensing part including a vibration sensor, a pressure sensor, or an optical sensor; and
    a measurement controller configured to measure the footstep information of the user through the sensing part and transmit the footstep information to the system server through the data communicator and configured to control the sensing part to stop measuring when footstep end information calculated by the system server using the received footstep information is received through the data communicator, or configured to measure the gravity center movement information of the user through the sensing part, transmit the gravity center movement information to the system server, and control the sensing part to stop measuring when kicking end information calculated by the system server using the received gravity center movement information and image information received from the image sensing device is received through the data communicator.

3. The screen soccer system of claim 2, wherein each of the first and second footstep sensing device further includes a distance measuring part configured to measure a distance by recognizing each other's position, and
    when a mutual position measurement signal is generated by setting information transmitted from the system server or operation of a setting switch provided on one side of the first footstep sensing device or the second footstep sensing device, the measurement controller of the first footstep sensing device or the second footstep sensing device generates position information thereof and transmits the position information to the system server through the data communicator of the first footstep sensing device or the second footstep sensing device.

4. The screen soccer system of claim 1, wherein the first footstep sensing device comprises a plurality of push plates, which allows the user to run on the plurality of push plates, and measures the footstep information by sensing a number of footsteps and a direction of the footsteps made on the plurality of push plates.

5. The screen soccer system of claim 1, wherein the image output part is configured to output a notification prompting the user to stop running when the user approaches a predetermined range from the second footstep sensing device.

6. A method of providing screen soccer, the method comprising:
    receiving, by a running information processor of a system server, footstep information of a user in real time from a first footstep sensing device which measures the footstep information through a data transceiver of the system server and converting the footstep information into running image information of the user;
    transmitting, by an image output part of the system server, the running image information to an image output device through the data transceiver;
    receiving, by the data transceiver, gravity center movement information of the user transmitted from a second footstep sensing device which measures movement of a gravity center and kicking motion information and soccer ball kicking information of the user transmitted from an image sensing device;
    analyzing and converting, by a kicking information processor of the system server, the gravity center movement information, the kicking motion information, and the soccer ball kicking information into kicked ball image information regarding a path of the kicked ball; and transmitting, by the image output part, the kicked ball image information to the image output device through the data transceiver, wherein the second footstep sensing device is provided separately from the first footstep sensing device and activated when running has finished on the first footstep sensing device, and measures the movement of the gravity center when motion is detected on the second footstep sensing device.

\* \* \* \* \*